United States Patent [19]

Pierson

[11] Patent Number: 4,472,279

[45] Date of Patent: Sep. 18, 1984

[54] ENDLESS BELT FILTER WITH STATIONARY GUIDE BARS

[76] Inventor: Henri G. W. Pierson, London Rd., Bozeat, Wellingborough, Northamptonshire, NN9 7JR, England

[21] Appl. No.: 470,288

[22] Filed: Feb. 28, 1983

[30] Foreign Application Priority Data

May 5, 1982 [GB] United Kingdom ............... 8212993

[51] Int. Cl.³ .......................................... B01D 33/00
[52] U.S. Cl. ................................... 210/386; 210/400; 100/118
[58] Field of Search ............... 210/783, 400, 401, 153, 210/160, 386; 162/348; 100/118, 211, 119; 209/307

[56] References Cited

U.S. PATENT DOCUMENTS 3,870,641 3/1975 Pierson ............................ 210/400
4,127,487 11/1978 Havalda .......................... 210/401
4,142,971 3/1979 LeFur et al. .................... 210/386
4,341,628 7/1982 Fujinami et al. ................ 210/401
4,377,479 3/1983 Pierson ............................ 210/400
4,377,480 3/1983 Pierson ............................ 210/350

Primary Examiner—Richard V. Fisher
Assistant Examiner—Wanda L. Millard
Attorney, Agent, or Firm—Ross, Ross & Flavin

[57] ABSTRACT

Slurry is fed (at 52) onto the upper run 46 of endless filter belt 48 and is dewatered by intermittently-operating means e.g. vacuum box 54, press assembly 56 and/or gravity box 66. The belt 48 is guided by a number of transverse guide bars 44, 76, 82, 84, 86, 88 and is progressed intermittently by a displaceable guide bar 74 whose forward movement extends the upper run 46. The bar 74 is coupled (e.g. by cables 106) with a slack-compensating guide bar 104 cooperating with the return run of the belt 48 and unidirectional means (e.g. arrester guide 94 and arrester roller 98) located therebetween allows movement of belt 48 only in the forward direction (arrow 114).

Because this belt filter incorporates well supported guide bars instead of conventional rollers, the belt 48 can be much wider than has hitherto been practicable and the overall length of the filter may be correspondingly reduced, further obviating guiding problems.

3 Claims, 5 Drawing Figures

ENDLESS BELT FILTER WITH STATIONARY GUIDE BARS

FIELD OF INVENTION

This invention concerns endless belt filters of the kind comprising a filter belt guided to extend around an endless path including an upper run (which is horizontal or near horizontal) onto which is fed a slurry to be dewatered and with which cooperates intermittently-operating dewatering means, which may comprise vacuum boxes, gravity drainage boxes or compression boxes, or a combination thereof, means being provided for progressing the belt stepwise, alternately with the operation of the dewatering means.

BACKGROUND ART

Throughout the world there is a growing interest in endless belt filters as aforesaid for dewatering and/or extracting vast numbers of materials, specifically but not exclusively fine coals, and mineral ores.

There is a practical limit to the length to which one can construct and endless belt filter, usually determined by the length of building in which it is to be housed. Accordingly attempts have been made to make the filter belts wider, but in practice the maximum width so far achieved has been of the order of four meters, and even so these have been difficult to operate effectively.

The problem with these wide filters are twofold.

Firstly, in order to achieve a reasonable area of filter belt, they still have to be built to lengths up to 20 meters. This normally means that extreme difficulties are encountered in guiding the filter belt. Secondly, substantial practical difficulties arise in attempting to support conventional rollers of four meters or greater axial length. Such rollers consist of tubular units supported only at their extremities and they are necessary for guiding and tensioning the belt.

An object of the present invention is to provide an endless belt filter construction by which both of these disadvantages may be obviated or minimised.

DISCLOSURE OF INVENTION

To achieve this object, the present invention provides an endless belt filter, of the kind referred to, in which guide means guiding the filter belt comprise transverse well supported stationary guide bars over or around which the belt extends, and in which progressing means for progressing the belt comprises a displaceable guide bar displacement of which serves to extend the upper run of the belt, and displaceable guide bar being coupled with a slack-compensating guide bar cooperating with a return run of the belt, unidirectional means, effective to restrict belt movement to its forward direction only, being provided between the displaceable guide bar and the slack-compensating guide bar.

Because such a belt filter does not incorporate guide rollers, it can be constructed to be much wider than has hitherto been thought to be practicable. For instance, the filter of the invention may be as wide as ten meters, although there seems to be no limit to the width that can be supported, save, of course for the width of the building housing the filter. Because the belt can be so wide, the overall length of the filter may correspondingly be reduced, for instance to as little as ten meters, with the result that other guiding problems, attendant upon the prior conventional filters, are obviated.

Preferably the unidirectional means comprises a stationary arrester cooperative with a movable arrester roller which serves, upon the belt attempting to move in the reverse direction, to pinch the belt against the stationary arrester.

In a practical embodiment of the belt filter of the invention, the displaceable guide bar and the slack-compensating guide bar are carried by respective pivoted levers, the coupling being provided by cable connections between the levers.

In order that the invention may be fully understood, it will be described further, by way of example, with reference to the accompanying drawings.

DETAILED DESCRIPTION OF THE INVENTION

The following description is, of course, purely illustrative, and not restrictive of the scope of the invention.

Figure 2:
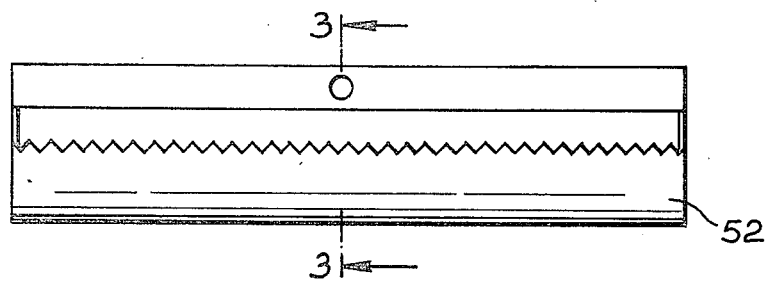
FIG. 2 is a front view of a feed arrangement suitable for the belt filter of the invention in the form of a conventional overflow weir.
Figure 3:
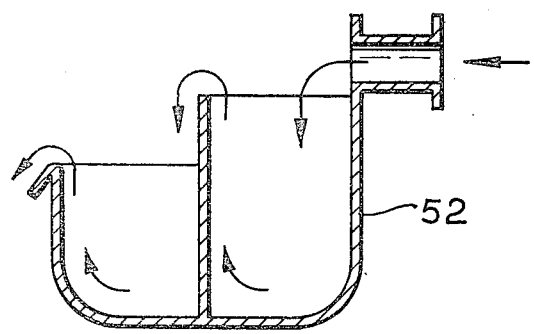
FIG. 3 is a cross-section along the line 3—3 of FIG. 2.
Figure 4:
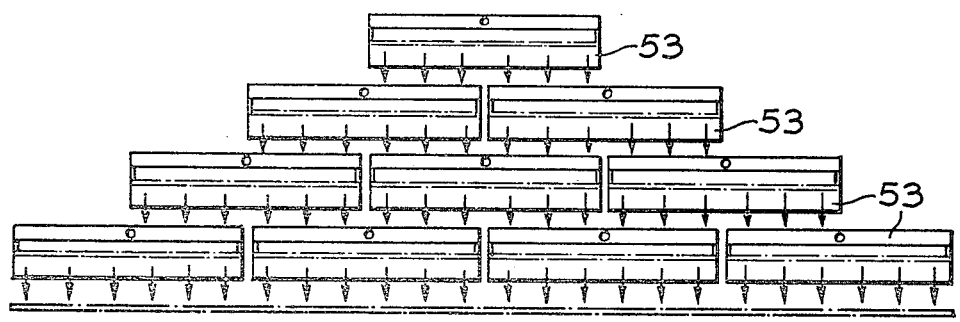
FIG. 4 is a front view, to a smaller scale, of another feed arrangement suitable for the belt filter of the invention in the form of a cascading system of overflow weirs, each similar to that shown in FIG. 2.

The illustrated belt filter of the invention may be constructed for instance, to be as wide as ten meters, or even more, in which case its length may be relatively short, for example of the order of ten to twelve meters. It comprises a support structure including side posts or legs 10, 12, 14, 16, 18, longitudinal struts 20 and transverse beams or girders, 22, 24, 26, 28, 30. Adjacent the legs 10 at the inlet end of the apparatus is a tension frame, indicated generally by the reference numeral 32, comprising upwardly-converging legs 34, 36 connected to the legs 10 by longitudinal struts 38 and 40. An input girder 42 is supported by the frame 32 and this in turn supports a rigid substantially semi-circular belt guide bar 44 by which an upper run, indicated generally by the reference numeral 46, of a filter belt 48 is guided to a feed box 50, supported by the transverse beams 22, 24. A slurry or other liquid-carried material required to be dewatered is fed onto the upper surface of the upper run 46 of the belt 48 within the feed box illustrated diagrammatically at 50. Feeding can be done in a traditional manner using an overflow weir 52 as illustrated in FIGS. 2 and 3. In the case of a very wide filter a series of cascading weirs 53, as shown in FIG. 4, can be mounted above the filter belt 48 to spread the flow evenly across the belt. In addition, in case of difficulties the first section of the filter can be without vacuum so as to permit gravity spreading of the slurry on the belt.

The filter belt 48 may, for example, be of a width of the order of ten meters, but of course the invention is applicable to structures of greater or narrower widths than ten meters.

Downstream of the feed box 50 is a series of suction or vacuum boxes of which part of one only is illustrated at 54. These suction boxes 54 terminate at a dewatering press assembly 56 which is supported by transverse box girders 58 which are mounted by their ends upon side fences 60 and which comprises upper and lower platens 62, 64 respective of which the lower platen 64 can be pressed upwards by appropriate means such as inflation of an underlying membrane (as described in my U.S. Pat. No. 4,377,480) to apply dewatering pressure to material carried on the upper run 46 of the belt 48. Following the press assembly 56 is a series of gravity boxes 66. The suction boxes 54, the press assembly 56 and the gravity boxes 66 all constitute dewatering means of the apparatus, but it is to be appreciated that it is not essential to the invention that the belt filter should have all three such means, and it may have any suitable combination thereof, or may have only one of such means, for instance the vacuum boxes only, all dependent upon the material required to be dewatered.

At the front end of the support structure, a pair of cantilever beams 68 extend forwardly from the legs 16, 18, and support pivots 70 for respective levers 72 between which extends a transverse displaceable guide bar 74 which defines the front extremity of the upper run 46 of the filter belt 48. From this guide bar 74 the filter belt 48 extends downwards and is then guided in a return run by a fixed guide bar 76 fixed to the front ends of the cantilever beams 68 and a pair of narrow rollers 78 which are journalled on the rear ends of the respective beams 68 and are of the same width as each of the beams.

From the rollers 78, the return belt run extends in an upwardly-inclined section 80 to a stationary transverse guide bar 82, and thence over successive stationary guide bars 84, 86 and 88, (supported respectively by the legs 14, 12, 10 and 36) and thence around a relatively light tensioning roller 90 which is located between the legs 34 so as to be capable of limited up and down movement simply to maintain a substantially constant tension in the belt 48 which then passes back to the belt guide bar 44.

Extending between the legs 16 below the rollers 78 is a cross beam 92 from which extend rearwardly a plurality (e.g. two or three) inclined arrester rails 94 which are supported at their upper ends by a cross-angle 96. The rails 94 serve to support an arrester roller 98 which extends transversely of the apparatus beneath the inclined section 80 of the filter belt 48 and tends, under the influence of gravity to roll towards the rollers 78 to form nips therewith.

Mounted on the rails 94 by pivots 100 are compensator bar levers 102 which support, at their upper ends, a transverse compensator bar 104 which contacts the underside of the inclined section 80 of the return run of the belt 48 just in advance of the transverse guide bar 82.

Figure 1A:
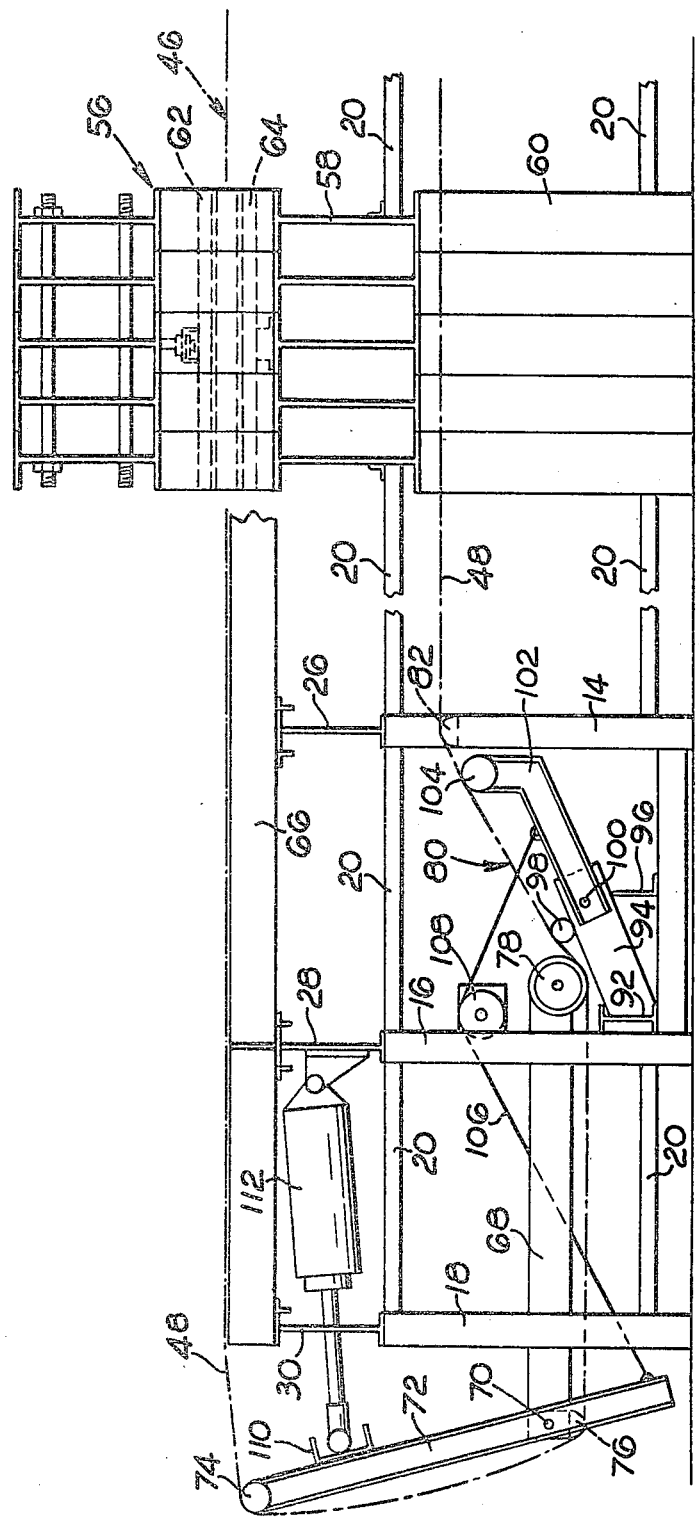
FIGS. 1A and 1B together constitute a side elevation illustrating diagrammatically a preferred embodiment of the belt filter of the invention.

Cables 106 connect approximately, with the middles of the compensator bar levers 102, extend over respective guide pulleys 108, and connect to the lower ends of the corresponding displaceable guide bar levers 72. As can be seen from FIG. 1A the upper ends of the levers 72 are connected by a crosshead 110 and a hydraulic ram 112 extends between the crosshead 110 and the transverse girder 28.

From the foregoing it is apparent that the means for guiding the belt 48 consists entirely of transverse guide bars and no guide rollers extending across the width of the belt are present. Indeed the only rollers in the entire apparatus are the narrow arrester rollers 78, the arrester roller 98, which is light and well supported on the rails 94, and the tensioning roller 90 which is evenly supported by the belt 48 itself.

The mode of operation of the apparatus will readily be understood from the foregoing description. Slurry to be dewatered is supplied to the feed box 50 and dewatering is effected through the filter belt 48 by the effect of vacuum, at the vacuum boxes 54, and/or by pressing at 56 and/or by gravity at the gravity boxes 66.

Figure 1B:
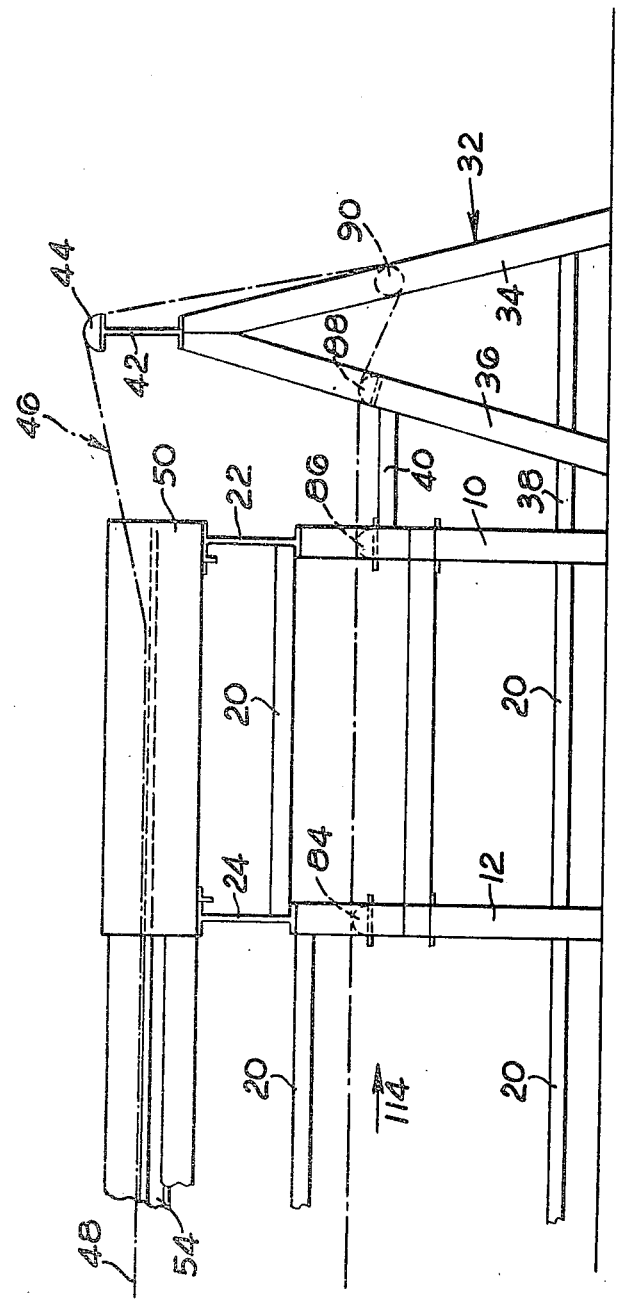

Whilst the upper run 46 of the belt is stationary due to application of pressure or vacuum, the ram 112 is retracted. As a result, the leading end of the upper run of the belt can drop down towards the bar 76, and in fact the belt length so relaxed is drawn into the inclined section by the compensator bar 104 being correspondingly raised by the action of the cables 106. If, now, the vacuum or pressure restraining the upper run 48 of the belt 46 is switched off, and the ram 112 is extended to the condition shown, the lower run of the belt is displaced in the direction of the arrow 114 (FIG. 1B), being prevented from running in the opposite direction by the arrester roller 98 ruuning down the rails 94 and cooperating with the rollers 78 and thereby ensuring that the movement of the belt is unidirectional.

As has already been stated, the principal advantage of the belt filter of the invention lies in the fact that it is constructed without the use of guide rollers for the filter band. The belt can therefore be very wide without any belt-guiding problems and the overall length of the belt may consequently be curtailed.

The invention is, of course, not confined to the precise details of the illustrated example, which has been given purely by way of example.

What I claim is:

1. An endless belt filter comprising an endless filter belt; a number of transverse well supported stationary guide bars over or around which the belt extends, such that one part of said belt forms a substantially horizontal upper run and the remainder thereof forms a return run; a displaceable guide bar displacement of which serves to extend the upper run of the belt in its forward direction and drive means for intermittently displacing said guide bar; a slack-compensating guide bar coupled to said displaceable guide bar and cooperating with the return run of the belt; unidirectional means, effective to restrict belt movement to its forward direction only, being provided between said displaceable guide bar and said slack-compensating guide bar so that the belt moves stepwise in said forward direction; feed means for supplying slurry to said belt and dewatering means co-operating with said upper run and operative, alternately with said drive means, to remove water from said slurry.

2. An endless belt filter as set forth in claim 1 wherein said unidirectional means comprises a stationary arrester and a movable arrester roller co-operative with said stationary arrester and operative to pinch the belt against said stationary arrester whenever said belt attempts to move in the reverse direction.

3. An endless belt filter as set forth in claim 1 wherein respective pivoted levers carry said displaceable guide bar and said slack-compensating guide bar, and cable connections provide the coupling between said levers.

* * * * *